April 30, 1963 W. ROTH 3,087,325
GYROSCOPIC MASS FLOWMETERS
Filed Aug. 7, 1961 2 Sheets-Sheet 1

INVENTOR
Wilfred Roth
BY
ATTORNEYS

INVENTOR
Wilfred Roth

United States Patent Office 3,087,325
Patented Apr. 30, 1963

3,087,325
GYROSCOPIC MASS FLOWMETERS
Wilfred Roth, 58 Brainard Road, West Hartford, Conn.
Filed Aug. 7, 1961, Ser. No. 129,621
11 Claims. (Cl. 73—3)

This invention relates to gyroscopic mass flowmeters of the oscillating or A.-C. type, and particularly to means for calibrating or checking the performance thereof during used.

Mass flowmeters of the gyroscopic type include a curved fluid conduit, usually of loop form, having inlet and outlet conduit sections connected therewith. The curved conduit is driven about a drive axis and fluid flowing in the conduit produces gyroscopic couples about at torque axis. The gyroscopic couples vary with the rate of mass flow of the fluid, and transducer or pickup means responsive to the couples produces an output varying with the fluid flow. The curved conduit may be continuously rotated about its drive axis or may be oscillated thereabout. In the latter case the output is an alternating or A.-C. signal varying in amplitude with fluid flow.

The present invention is particularly concerned with the latter type of flowmeter. The general theory and examples of suitable structures are given in my U.S. Patent No. 2,865,201, issued December 23, 1958.

In production, the mass flowmeters will commonly be calibrated in terms of rate of fluid flow. Also, by integrating the rate output over a period of time, the total mass of the fluid flowing through the instrument in that period of time may be obtained.

In use, a mass flowmeter will often be installed in a pipe line and used over extended periods of time. After a period of use, it is frequently desired to check its performance to make sure it is operating properly. While the instrument could be removed from the pipe line, taken to a standardization laboratory and checked under accurate flow conditions, this procedure is troublesome and expensive, and removes the flowmeter from service during the checking period.

The present invention is directed to the provision of means for checking the performance of the mass flowmeter without removing it from the pipe line. Actual recalibration of the flowmeter is possible, and may be termed "in-stream calibration." Or, the invention may be used simply to determine whether the instrument is functioning properly.

In accordance with the invention, a loop conduit structure is employed whose mass is somewhat unbalanced with respect to the drive and torque axes. This unbalance may be produced by the deliberate adding of a small mass, or may be an unbalance present in normal production. The unbalanced mass results in an A.-C. torque about the torque axis which is in quadrature with the A.-C. torque due to variations in mass flow. Accordingly, the corresponding A.-C. outputs of the transducer will be in quadrature. A phase-sensitive device is then employed which responds substantially only to the quadrature component during the checking period. By suitable arrangement of the circuits, the quadrature signal can be used to check the performance of substantially all portions of the apparatus normally used in producing an indication of mass flow.

As indicated in my application Serial No. 6,237, filed February 2, 1960 for "Gyroscopic Mass Flowmeters," a synchronous detector in phase with the mass flow signal may be employed to eliminate extraneous signal components in the transducer output which would impair the accuracy of measuring mass flow. When such a synchronous detector is employed during normal operation, a performance check may be made by changing the phase of the synchronous detection by 90°, so as to produce an output signal or indication corresponding to the quadrature (mass unbalance) signal.

For a given instrument, the magnitude of the check signal resulting from the mass unbalance may be determined during production, and may be marked on the indicating meter (if used), or otherwise recorded. Departures therefrom during use may then be readily ascertained. With suitable provision in the circuitry of the mass flowmeter, the flowmeter may be readjusted until the predetermined value of the check signal is obtained. Or, if desired, a servo system may be employed to correct the calibration periodically.

The invention will be more fully understood from the following description of specific embodiments thereof taken in conjunction with the drawings, in which:

FIG. 6(a) shows an alternative which may be incorporated in the arrangement of FIG. 6.

Figure 1:
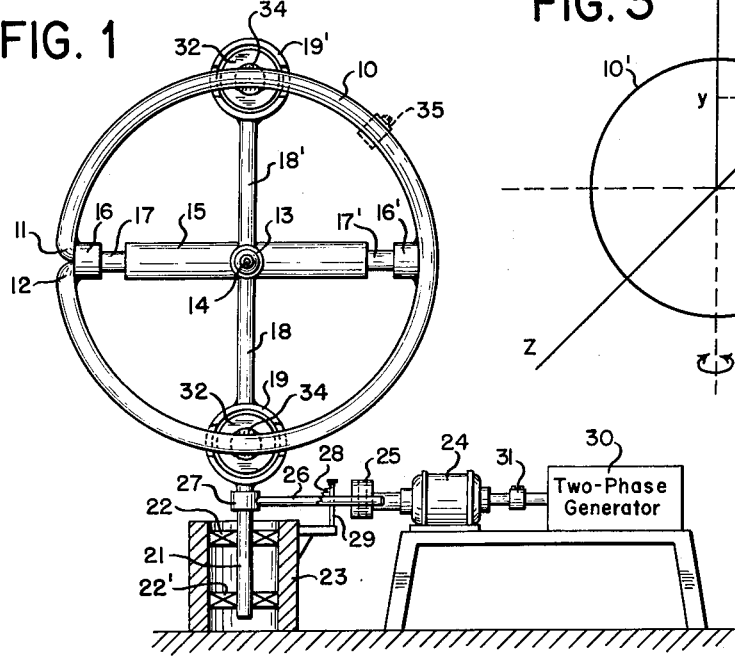
FIG. 1 shows an A.-C. mass flowmeter with which the invention may be employed.
Figure 2:
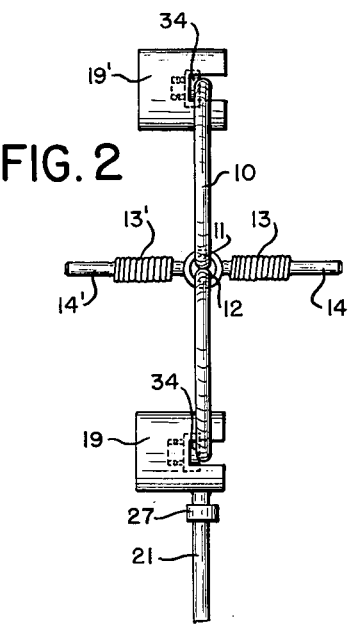
FIG. 2 is a left elevation of the flowmeter of FIG. 1.

Referring to FIGS. 1 and 2, an A.-C. mass flowmeter having a structure similar to those in my aforesaid patent and application is shown. The curved fluid conduit is shown in the form of a loop 10 bent inwardly at 11 and 12 to form inlet and outlet fluid conduit sections extending to the center of the loop, and then connected by flexible means such as bellows 13, 13' to conduit sections 14, 14' through which fluid flow is to be measured. Member 15 is hollow and the ends 16, 16' thereof are attached to the loop to form part of the loop structure. sections 17, 17' of reduced cross-section serve as torsional springs to provide a restoring force urging loop 10 to the neutral position shown. The axis of member 15 is the torque axis, and is here assumed to be horizontal.

Member 15 is attached to vertical members 18, 18' and output or pickup transducers 19, 19' are attached at the ends of 18, 18', respectively. Shaft 21 is attached to the lower portion of transducer 19 and is rotatably mounted by bearings 22, 22' in housing 23 for rotational oscillation. The axis of shaft 21 is the drive axis. The loop structure is oscillated about the drive axis by motor 24 through an eccentric cam 25 bearing against a rod 26 affixed to the shaft 21 by collar 27. Spring 28 is attached at one end to rod 26 and at the other end to a stationary support 29 so as to hold the rod in engagement with the cam. For convenience of illustration the point at which the spring 28 is attached to support 29 is shown lying above the rod, but in practice it will ordinarily be in line with the rod.

A reference signal generator, here shown as a two-phase generator 30, is shown attached to the shaft of motor 24 by collar 31. Inasmuch as the frequency and phase of the oscillation of the drive shaft 21 will be fixed with respect to the rotation of the shaft of motor 24, the frequency and phases of the outputs of generator 30 will be substantially fixed with respect to the loop oscillation about the drive axis.

Transducers 19, 19' are here shown as of the "velocity" type. Each transducer has a casing attached to member 18 or 18'. The casing contains a magnetic core, and a cooperating coil mounted on coil form 34 is attached to the loop conduit 10. It will be understood that although the housings of transducers 19, 19′ oscillate about the drive axis, they are fixed with respect to the torque axis. Consequently, movement of loop 10 about the torque axis will produce a corresponding movement of the coils in the respective magnetic fields and corresponding output voltages will be generated. The amplitude of oscillation about the drive axis is ordinarily quite small, and in many cases it may be satisfactory to mount the housings of the transducers 19, 19′ so that they are fixed with respect to housing 23.

While transducers of the velocity type are preferred, other types such as displacement transducers may be employed if desired.

The detailed structure and arrangement of the loop and supports, and the manner of driving it, may vary widely from that shown. Ordinarily support members are rigidly attached to the loop conduit so as to mount it for rotation about the torque axis, and such members together with the loop itself form the loop conduit structure. The structure shown is relatively easy to understand and suffices to explain the principles of operation of the present invention.

The two transducers 19, 19′ have their coils connected in series-aiding for movement of the loop about the torque axis (axis of member 15) and this assists in eliminating certain types of extraneous signals as described in the aforesaid application. However, a single transducer may be employed if desired.

In accordance with the present invention, the mass of the loop is made somewhat unbalanced with respect to the drive and torque axes. This may be accomplished by attaching a small mass to the loop, for example a short annular section as shown in dotted lines at 35 in FIG. 1. Or, an inherent unbalance present in normal manufacture may suffice. Only a small degree of unbalance is required in many cases, depending upon the sensitivity of the instrument, and additional amplification for the signal resulting from the mass unbalance could be employed if desired.

Figure 3:
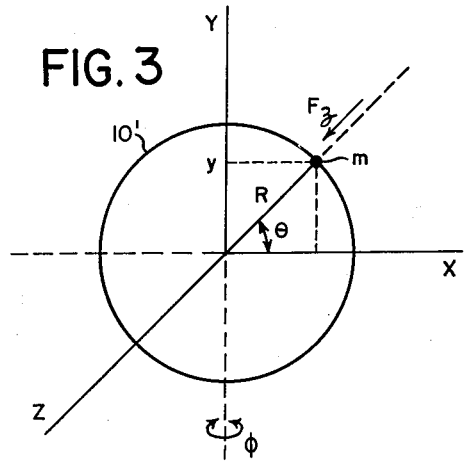
FIG. 3 illustrates certain principles of the invention.

Referring to FIG. 3, circle 10′ represents the loop conduit and a small mass $m$ is shown in the first quadrant. The loop is assumed to have a neutral position in the X—Y plane. The Y-axis corresponds to the drive axis, the X-axis corresponds to the torque axis, and the loop is oscillated through a small angle $\phi$ about the drive axis.

The loop has a radius R and the angle between the mass $m$ and the X-axis is denoted $\theta$. As a result of the oscillation about the drive axis, a force $F_z$ is produced on the mass which accelerates it in the Z direction. This force is equal to $m \times a$, where $a$ is the acceleration of the mass in the Z direction.

The oscillation of the loop about the drive axis may be expressed as:

$$\phi = \phi_0 \cos \omega t \quad (1)$$

Here $\phi_0$ is the maximum angular displacement about the Y-axis, $\omega$ is equal to $2\pi f$ where $f$ is the frequency of the angular oscillation, and $t$ is time.

For small angular displacements such as are commonly employed in mass flowmeters of this type, the acceleration $a$ may be given as:

$$a = -\omega^2 \phi_0 R \cos \theta \cos \omega t \quad (2)$$

Multiplying Equation 2 by $m$ gives $F_z$.

The output torque due to the mass $m$ is equal to the force $F_z$ multiplied by the distance between the mass and the output torque axis X. Thus, the output torque $T_x$ may be calculated as follows:

$$T_x = F_z R \sin \theta \quad (3)$$

$$= -\omega^2 \phi_0 m R^2 \sin \theta \cos \theta \cos \omega t \quad (4)$$

$$= K_1 \omega^2 \cos \omega t \quad (5)$$

It will be noted that Equation 4 includes a number of factors which are design constants, and these are denoted $K_1$ in Equation 5.

Movement of the loop about the torque axis is constrained by the torsional springs 17, 17′ in FIG. 1. For a drive frequency well below the natural resonant frequency of the loop 10 about the torque axis (discussed in the aforesaid patent), the angular displacement about the torque axis of the loop is $T_x$ divided by the spring constant. With a velocity type pickup, the output voltage can be obtained by differentiating the expression for displacement. This gives:

$$V_u = K_1' \omega^3 \sin \omega t \quad (6)$$

where $V_u$ is the voltage output of the transducers 19, 19′ due to the unbalanced mass $m$, and $K_1'$ includes $K_1$, the spring constant, and a constant depending upon the transducer sensitivity.

The transducer output corresponding to the rate of mass flow can be derived from information and equations given in the aforesaid patent and application. For oscillation about the drive axis as given in Equation 1, the torque due to mass flow, denoted $T_f$, can be expressed as:

$$T_f = \frac{k}{g} \frac{dW}{dt} 2\pi R^2 \omega \phi_0 \sin \omega t \quad (7)$$

Here $k$ is a constant, $g$ is the acceleration of gravity, W is the pounds of fluid flowing across any cross-section of the loop, and the other constants are as defined before. By denoting the design constants as $K_2$, Equation 7 becomes:

$$T_f = K_2 \omega \frac{dW}{dt} \sin \omega t \quad (8)$$

The corresponding voltage output of a velocity transducer $V_f$ then becomes:

$$V_f = K_2' \omega^2 \frac{dW}{dt} \cos \omega t \quad (9)$$

It will be noted that the torque Equations 5 and 8 involve cosine and sine functions of $\omega t$, respectively. Thus, the A.-C. torque due to the unbalanced mass $m$ is in quadrature with the torque due to mass flow. The corresponding outputs of the pickup transducer will also be in phase quadrature. For velocity-types of transducers, Equations 6 and 9 apply and it will be observed that one is a sine function and the other a cosine function of $\omega t$, thus indicating phase quadrature.

By using a properly-phased synchronous detector, the signal due to the unbalanced mass may be separated and used as a check on the performance of the mass flowmeter. Further, as described in the aforesaid application, it is desirable to use a synchronous detector properly phased with respect to the mass flow signal in obtaining the rate of mass flow, so as to eliminate extraneous sources of error. Thus, if a synchronous detector is employed during normal operation, the check signal may be obtained by simply changing the reference phase of the detector. The check signal can then be used as a check on practically all components of the mass flowmeter which enter into the indication of mass flow.

It will be noted from Equation 4 that the torque due to the unbalanced mass includes the function $\sin \theta \cos \theta$. Thus, the torque $T_x$ will be zero if the unbalanced mass $m$ is on either the X or the Y axis. For any other position the torque will be finite and may be used for checking purposes. A maximum will be obtained at the 45° point indicated, or at similar points in the other quadrants. Due to the nature of this expression, it will also be understood that if the unbalanced mass $m$ is in the first or third quadrant, a torque of one direction will be obtained, whereas if the unbalanced mass is in the second or fourth quadrant, the polarity will be reversed. This corresponds to a 180° shift in time phase and can readily be taken into account in the detailed design. If the loop structure permits, the additional mass could be placed at some point thereon other than the loop itself, so long as the resultant unbalance is effective about both drive and torque axes.

Figure 4:
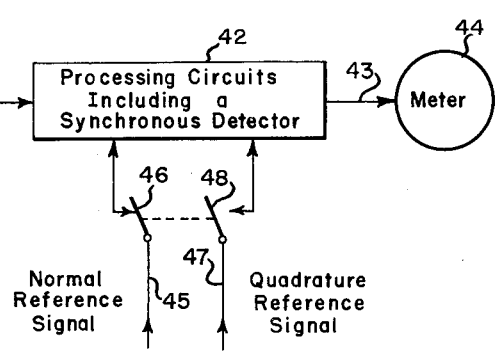
FIG. 4 is a block diagram illustrating an overall arrangement of the invention.

Referring now to FIG. 4, pickup 41 represents one or more transducers positioned to respond to movement of the loop about the torque axis. The output of the pickup passes through processing circuits 42 which include a synchronous detector. These may include simply an amplifier and detector circuit for producing a signal in line 43 corresponding to the mass flow, or may include additional circuits such as integrators as described in the aforesaid application. The mass flow output in line 43 may be supplied to a meter 44 or other instrumentality to give an indication of mass flow.

If the synchronous detector in 42 is used in normal operation, a reference signal of proper phase is fed through line 45 and switch 46 to unit 42. Another reference signal is supplied to line 47 which is in quadrature with that in line 45. When switch 48 is closed, the quadrature reference signal is supplied to the synchronous detector and meter 44 will then indicated the signal due to the unbalanced mass of the loop conduit structure. Switches 46 and 48 are shown ganged together for convenience in shifting from normal to checking conditions, and vice versa.

By placing a mark on meter 44 during the calibration of the instrument at the time of manufacture, the checking will indicate a departure from proper operation. A substantial departure will usually mean that some component has failed, or radically changed in characteristics. Under suitable circumstances, however, the checking signal can be used to readjust the instrument. For example, a gain control may be provided in unit 42 to correct for changes in amplifier gain, pickup sensitivity, etc.

It will be understood that although it is desirable to employ a synchronous detector both during normal operation and during checking, if desired it can be arranged to be used only during checking.

Figure 5:
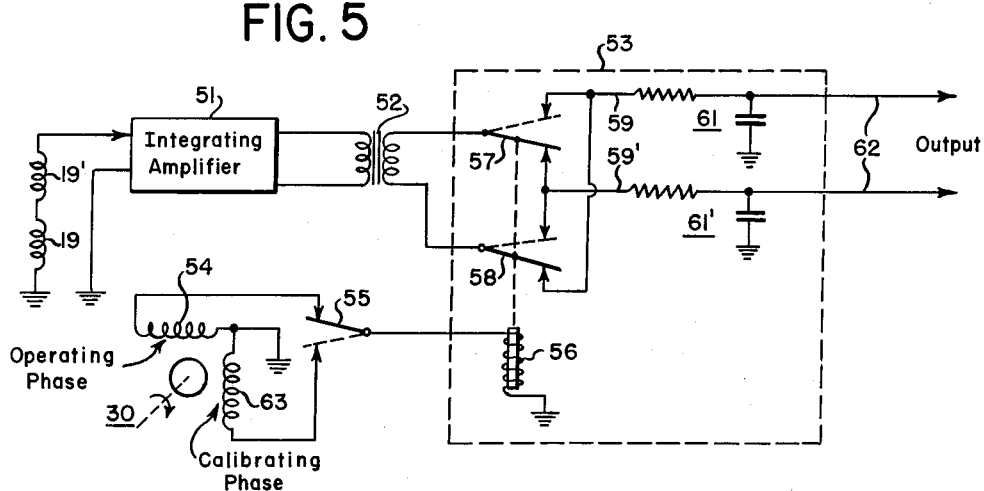
FIG. 5 is a schematic circuit diagram of one embodiment of the invention.

Referring now to FIG. 5, an arrangement is shown using integration to eliminate the frequency amplitude factor as described in the aforesaid application. Briefly, variations in the frequency of oscillation about the drive axis may result in errors in measurement, since in general the transducer output includes a frequency or $\omega$ term raised to some power. For example, Equation 9 has a frequency amplitude factor $\omega^2$, where the exponent is 2.

In the preferred arrangement of the aforesaid application, the transducer output signal is integrated a sufficient number of times to substantially eliminate the frequency amplitude factor. However, as also described in that application, an A.-C. reference signal may be employed having the same frequency as the drive frequency and, by performing calculus operations (that is, integration or diffrentiation) on the transducer output signal or on the reference signal, or both, with a subsequent algebraic operation (multiplication or division), the drive frequency dependency can be substantially eliminated.

The present invention can be employed with mass flowmeters employing any of these procedures for eliminating the frequency amplitude factor. In FIG. 5 the preferred method of integrating the transducer signal is employed.

The output of transducers 19, 19' is supplied to an integrating amplifier 51. With velocity-type pickups whose output is in accordance with Equation 9, two stages of integration in 51 will eliminate the $\omega^2$ term. The output of the integrating amplifier is then supplied through an isolating transformer 52 to a synchronous detector 53.

A reference phase for the synchronous detector is obtained from one winding 54 of the two-phase generator 30, and is supplied through switch 55 to relay actuating coil 56. Two switch arms 57 and 58 of the relay move from full line to dotted positions in synchronism with the reference signal from winding 54. Thus the output of transformer 52 to lines 59, 59' reverses in synchronism with the reference signal. R-C integrators 61 and 61' smooth the detected signal. The D.-C. output in lines 62 varies in magnitude with the amplitude of the in-phase or reverse phase (180° phase shift) components of the applied D.-C. signal, and reverses in polarity with a phase reversal.

The operation of a synchronous detector such as shown in 53 is well known in the art and need not be described further. Other types are also known in the art and may be employed if desired. Some types employ a commutator, as illustrated in my aforesaid application. In such case a single commutator may be driven by motor 24 with provision for changing its phase, or two commutators at 90° may be alternatively switch into circuit in a manner analogous to the arrangement of FIG. 5, etc.

Transformer 52 is employed together with two integrating circuits isolated from ground so that the D.-C. output in lines 62 is floating. In this embodiment a floating output was necessary for subsequent instrumentation, but if desired the synchronous detector could be modified to provide a single-ended output.

The phase of winding 54 is selected to correspond to the phase of the mass flow signal in the output of transformer 52, so that the detector 53 is phased to pass this signal and exclude the quadrature signal. When it is desired to check the flowmeter application, switch 55 is moved to its dotted position. Winding 63 of the two-phase generator gives an output in quadrature with that of winding 54. Accordingly, the phase of the operation of relay 56 is shifted by 90° so as to be in phase with the quadrature signal in the output of transformer 52 which corresponds to the unbalanced mass. Under these conditions the D.-C. output in line 62 will corespond to the check or calibrating signal, and may be supplied to a meter or other instrumentality as described before. With a gain control in amplifier 51, the gain can be adjusted until the check signal is the proper value.

Figure 6:
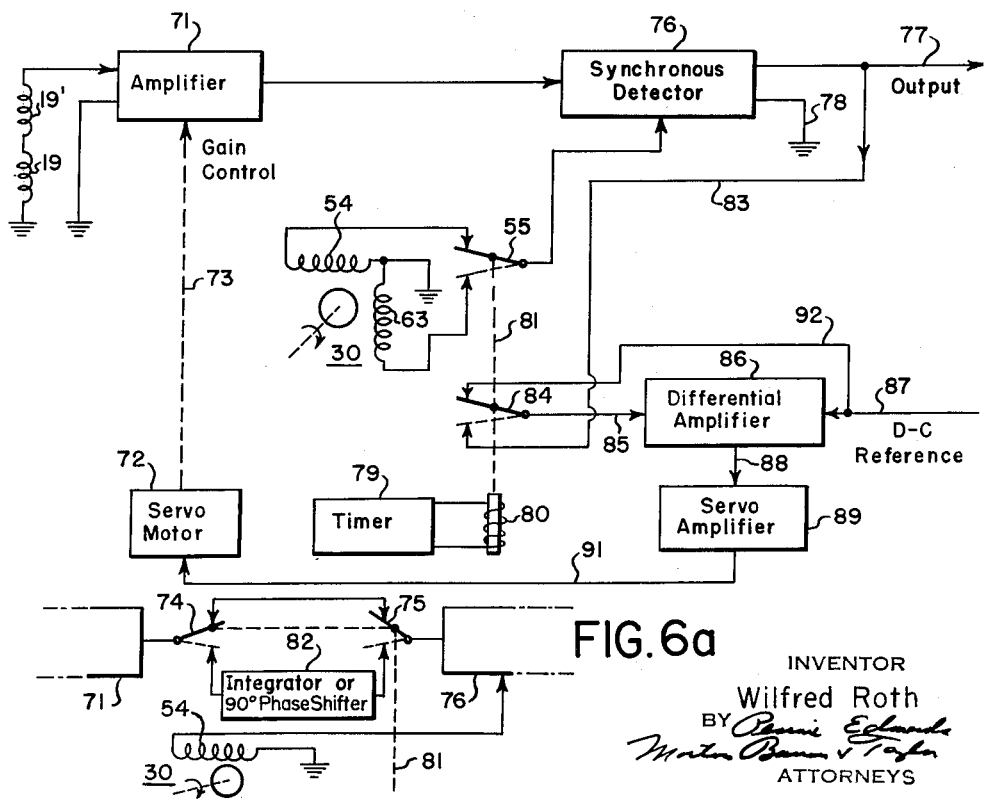
FIG. 6 is a block diagram of an automatic calibrating system.

Referring now to FIG. 6, a system is shown in which the mass flowmeter may automatically be recalibrated at periodic intervals. The outputs of transducers 19, 19' are supplied to amplifier 71 arranged so that its gain can be controlled by servomotor 72 through a mechanical connection 73. For example, a potentiometer driven by the motor shaft may be employed. Amplifier 71 may be a linear amplifier if desired, but is advantageously an integrating amplifier as described in FIG. 5. The output of amplifier 71 is supplied to the synchronous detector 76. While this may be similar to that shown at 53 in FIG. 5, it is here shown as providing a single-ended output in line 77, one output terminal being grounded as shown at 78.

Two-phase generator 30 delivers a normal operating phase reference voltage from winding 54, and a quadrature calibrating phase voltage from winding 63 as before. Switch arm 55 operates as before to supply the two phases alternatively to the synchronous detector 76.

A timer 79 is provided to shift from operating to calibrating positions at desired intervals. These intervals can be sufficiently short and infrequent so as not to affect normal use appreciably. The timer actuates relay 80, thereby shifting switch 55 to the dotted position through the mechanical connection 81 and supplying the calibrating reference phase to the synchronous detector. Switch 84 is ganged with switch 55 through connection 81.

During calibration, the output of the synchronous detector is delivered through line 83 and switch 84 (dotted position) to one input 85 of differential amplifier 86. A D.-C. reference voltage is supplied to the other input of the differential amplifier through line 87. Amplifier 86 may be of known construction and delivers an output in line 88 corresponding to the difference between the D.-C. levels in input lines 85 and 87. This output is supplied to servo-amplifier 89 and the output of the latter is supplied through line 91 to actuate a servomotor 72 of the reversible D.-C. type.

If the output in line 83 during calibration corresponds to the predetermined D.-C. reference level in 87, there is no output to the servo-amplifier and the gain of amplifier 71 remains unchanged. However, if the output in line 83 is either greater or less than the D.-C. reference level, servomotor 72 will change the gain of amplifier 71 to reduce the difference to zero, or very nearly zero. The D.-C. reference level in line 87 may be predetermined at the time of manufacture so that, if the output during calibration is equal to the D.-C. reference level, the output during normal operation will correspond to the instrument calibration. Accordingly, by adjusting the gain of amplifier 71 to maintain this condition during operation, proper calibration at all times is assured.

During normal operation, with relay switch 84 in its full line position, the input line 85 of the differential amplifier is brought to the D.-C. reference potential of line 87 through connection 92. Thus there will be no output from the differential amplifier during normal operation, and a previous setting of the gain control is undisturbed.

It will be observed from Equations 5 and 8 that the torques due to the unbalanced mass and to the fluid flow contain frequency amplitude factors with different exponents, namely, $\omega^2$ and $\omega$. Therefore, with any given type of pickup transducer, the frequency amplitude factors of the corresponding signals will have different exponents. With a velocity type transducer, Equation 6 shows that the calibration signal contains an $\omega^3$ term, whereas Equation 9 shows that the fluid flow signal contains an $\omega^2$ term.

Accordingly, if the two signals are processed in identical manner, they will always differ by a factor $\omega$. For example, if amplifier 51 (FIG. 5) or 71 (FIG. 6) is arranged to double-integrate, it will reduce the exponents of each signal by 2. The $\omega^2$ in Equation 9 then becomes $\omega^0$ ($=1$), and the frequency amplitude factor is eliminated. However, the $\omega^3$ in Equation 6 will be reduced to $\omega$, leaving some frequency dependency. Thus, the calibrating signal will vary in amplitude if the drive frequency changes, whereas the mass flow signal will not.

In many parts of the country the A.-C. power line frequency is held quite constant and, with a synchronous driving motor 24, the drive frequency may be sufficiently constant so that the calibrating signal will not vary substantially due to this factor. However, in environments where the drive frequency is not held sufficiently constant, the frequency amplitude factor of the calibrating signal may be completely eliminated by suitable processing. This may be accomplished in the arrangements of FIGS. 5 and 6 by providing an additional stage of integration for the quadrature signal corresponding to mass unbalance.

FIG. 6(a) shows a modification of FIG. 6 which accomplishes this. Instead of feeding the output of amplifier 71 directly to synchronous detector 76, two switches 74 and 75 are provided which are ganged for operation by relay 80 through the mechanical connection 81. During normal operation switches 74, 75 are in their full-line positions and the output of the amplifier is supplied directly to the detector as above described. However, during the calibrating intervals, switches 74, 75 are moved to their dotted positions, thereby introducing stage 82 in cascade with amplifier 71.

By designing stage 82 to provide a single stage of integration, the quadrature signal component from transducers 19, 19' will be integrated one more time than the mass flow signal component. With double integration in 71, the frequency amplitude factors in both signal components are eliminated. Integrator 82 may be of unity gain at the loop oscillation frequency, or some other fixed gain as desired.

A single stage of integration will introduce a 90° phase shift of the quadrature signal as supplied to the detector 76. Accordingly, it is unnecessary to change the reference phase of the synchronous detector 76. Thus switch 55 in FIG. 6 may be eliminated, and the output of reference winding 54 in generator 30 may be used for both fluid flow and calibration.

The additional stage of integration may also be used in FIG. 5, and switches provided for connecting the additional stage in cascade with integrating amplifier 51 during the checking interval.

In situations where additional integration is not required, unit 82 could be designed to provide a 90° phase shift at the drive frequency and inserted during checking in lieu of changing the reference phase of the synchronous detector. In general, it will be understood that it is the phase of the synchronous detector relative to the signal components supplied thereto which is important, and the relative phase may be changed by 90° by changing either the phase of the signal components or the reference phase of the detector. In general, it is preferred to change the reference phase rather than introducing a 90° phase shift in the signal path (unless integration is desired), since a phase shift circuit is likely to be frequency sensitive and changing the reference phase is usually simpler and less expensive.

The aforesaid application Serial No. 6,237 describes other arrangements utilizing a reference voltage in eliminating a frequency amplitude factor in the mass flow signal. The present invention may also be used in such arrangements. As will be understood by those skilled in the art, the circuits should be designed so that they operate to provide an output corresponding to the fluid flow signal during normal operation, and an output corresponding to the quadrature unbalanced mass signal during checking or calibration. In the embodiments described in the aforesaid application, the phase of the reference signal generator may be changed for checking purposes, a 90° phase shift may be introduced in the signal path, an additional stage of integration or differentiation may be introduced in the mass flow or reference signal paths, respectively, etc.

It will be understood that checking the operation of the flow meter can be accomplished even though fluid is flowing through the loop conduit. Due to the quadrature relationship between the fluid flow and mass unbalance signal components, the synchronous detector prevents the quadrature component from affecting the measurement of fluid flow during normal operation, and prevents the fluid flow from affecting the checking signal during the checking operation. Of course, fluid flow will not be measured during the checking operation, but the checking intervals may be made sufficiently short and infrequent so that this factor may not be important. If desired, fluid flow could be shut off during the checking operation.

The invention has been described in connection with specific embodiments thereof, and the principles on which it is based have been explained in detail. Many modifications are possible within the spirit and scope of the invention, and the manner in which the invention can be applied in a particular arrangement will be clear to those skilled in the art.

I claim:

1. In a gyroscopic mass flowmeter including a curved fluid conduit structure and inlet and outlet conduit sections connected therewith, means for oscillating the curved conduit structure about a drive axis to produce gyroscopic couples about a torque axis varying with fluid flow in the conduit, transducer means responsive to movement of the curved conduit structure about the torque axis for producing an alternating signal varying with fluid flow, and means for utilizing said signal to produce an indication of fluid flow; means for checking the operation of the flowmeter which comprises means for providing an unbalanced mass of the curved fluid conduit structure about the drive and torque axes to produce an alternating signal component from the transducer means in phase quadrature with the signal corresponding to fluid flow, and phase-sensitive means responsive substantially only to said quadrature component during said checking.

2. Apparatus in accordance with claim 1 in which said phase-sensitive means is a synchronous detector for producing a check signal corresponding to said quadrature component.

3. A gyroscopic mass flowmeter which comprises a curved fluid conduit structure and inlet and outlet conduit sections connected therewith, means for oscillating the curved conduit structure about a drive axis to produce gyroscopic couples about a torque axis varying with fluid flow in the conduit, said curved conduit structure having an unbalanced mass about the drive and torque axes, transducer means responsive to movement of the curved conduit structure about the torque axis for producing an alternating signal component varying with fluid flow and an alternating signal component in phase quadrature therewith corresponding to the mass unbalance, means responsive to the output of the transducer means for producing an indication of fluid flow, and phase-sensitive means responsive substantially only to said quadrature component during a checking interval for producing a check signal.

4. A gyroscopic mass flowmeter which comprises a curved fluid conduit structure and inlet and outlet conduit sections connected therewith, means for oscillating the curved conduit structure about a drive axis to produce gyroscopic couples about a torque axis varying with fluid flow in the conduit, said curved conduit structure having an unbalanced mass about the drive and torque axes, transducer means responsive to movement of the curved conduit structure about the torque axis for producing an alternating signal component varying with fluid flow and an alternating signal component in phase quadrature therewith corresponding to the mass unbalance, means including a synchronous detector connected to receive the output of the transducer means and produce an output signal, means for phasing the synchronous detector relative to the signals supplied thereto to produce an output signal corresponding to fluid flow, and means for changing the relative phase of the synchronous detector and the signals supplied thereto to produce an output check signal corresponding to the quadrature signal component.

5. A gyroscopic mass flowmeter which comprises a curved fluid conduit structure and inlet and outlet conduit sections connected therewith, means for oscillating the curved conduit structure about a drive axis to produce gyroscopic couples about a torque axis varying with fluid flow in the conduit, said curved conduit structure having an unbalanced mass about the drive and torque axes, transducer means responsive to movement of the curved conduit structure about the torque axis for producing an alternating signal component varying with fluid flow and an alternating signal component in phase quadrature therewith corresponding to the mass unbalance, means including a synchronous detector connected to receive the output of the transducer means and produce an output signal, means for phasing the synchronous detector substantially in phase with the fluid flow alternating signal component supplied thereto to produce a corresponding output signal, and means for changing the relative phase of the synchronous detector and the signals supplied thereto to synchronously detect the quadrature signal component and produce a corresponding output check signal.

6. A gyroscopic mass flowmeter which comprises a curved fluid conduit structure and inlet and outlet conduit sections connected therewith, means for oscillating the curved conduit structure about a drive axis to produce gyroscopic couples about a torque axis varying with fluid flow in the conduit, said curved conduit structure having an unbalanced mass about the drive and torque axes, transducer means responsive to movement of the curved conduit structure about the torque axis for producing an alternating signal component varying with fluid flow and an alternating signal component in phase quadrature therewith corresponding to the mass unbalance, means including a synchronous detector connected to receive the output of the transducer means and produce an output signal, means synchronized with the oscillation of the curved conduit structure about the drive axis for producing selectable quadrature phase operations of the synchronous detector, and means for rendering said quadrature phase operations of the synchronous detector effective alternatively to produce an output signal corresponding alternatively to fluid flow and to the quadrature signal component.

7. A gyroscopic mass flowmeter which comprises a fluid conduit of loop form, means mounting said loop for angular oscillation about mutually perpendicular drive and torque axes approximately in the plane of the loop, driving means including a motor for oscillating the loop conduit about the drive axis to produce gyroscopic couples about the torque axis varying with fluid flow, said loop conduit having an unbalanced mass about the drive and torque axes, transducer means mounted to respond to movement of the loop conduit about the torque axis for producing an alternating signal component varying with fluid flow and an alternating signal component in phase quadrature therewith corresponding to the mass unbalance, circuit means including a synchronous detector connected to receive the output of the transducer means and produce an output signal, indicating means connected to receive said output signal, a two-phase generator driven by said motor for providing phase quadrature reference signals for the synchronous detector, and means for alternatively supplying said reference signals to the synchronous detector to produce indications corresponding alternatively to the fluid flow signal component of the transducer means and to the quadrature signal component thereof.

8. A gyroscopic mass flowmeter which comprises a structure having a fluid conduit of loop form, means mounting said loop conduit structure for angular oscillation about mutually perpendicular drive and torque axes approximately in the plane of the loop, driving means including a motor for oscillating the loop conduit structure about the drive axis to produce gyroscopic couples about the torque axis varying with fluid flow, said loop conduit structure having an unbalanced mass about the drive and torque axes, transducer means mounted to respond to movement of the loop conduit structure about the torque axis for producing an alternating signal component varying with fluid flow and an alternating signal component in phase quadrature therewith corresponding to the mass unbalance, circuit means including a synchronous detector connected to receive the output of the transducer means and produce an output signal, indicating means connected to receive said output signal, a circuit producing a substantially 90° phase shift at the frequency of oscillation of the loop conduit structure, and means for inserting said circuit between the transducer means and the synchronous detector and removing it therefrom to alternatively produce an output signal indication corresponding to fluid flow and to the quadrature signal component.

9. A gyroscopic mass flowmeter which comprises a curved fluid conduit structure and inlet and outlet conduit sections connected therewith, means for oscillating the curved conduit structure above a drive axis to produce gyroscopic couples about a torque axis varying with fluid flow in the conduit, said curved conduit structure having an unbalanced mass about the drive and torque axes, transducer means responsive to movement of the curved conduit structure about the torque axis for producing an alternating signal component varying with fluid flow and an alternating signal component in phase quadrature therewith corresponding to the mass unbalance, means including a variable gain amplifier and a synchronous detector connected to receive the output of the transducer means and produce an output signal, means synchronized with the oscillation of the curved conduit structure about the drive axis for producing selectable quadrature phase operations of the synchronous detector, means for rendering one of said phase operations of the synchronous detector effective during normal operation to produce an output corresponding to fluid flow, means for periodically rendering the other of said phase operations of the synchronous detector effective to produce a check output corresponding to the quadrature signal component, and means for utilizing departures of said check output from a predetermined value to change the gain of said amplifier to reduce the departures.

10. A gyroscopic mass flowmeter which comprises a curved fluid conduit structure and inlet and outlet conduit sections connected therewith, means for oscillating the curved conduit structure about a drive axis to produce gyroscopic couples about a torque axis varying with fluid flow in the conduit, said curved conduit structure having an unbalanced mass about the drive and torque axes, transducer means responsive to movement of the curved conduit structure about the torque axis for producing an alternating signal component varying with fluid flow and an alternating signal component in phase quadrature therewith corresponding to the mass unbalance, said alternating signal components having amplitude factors varying with the frequency of oscillation about the drive axis with respective different exponents, means including a synchronous detector connected to receive the output of the transducer means and produce an output signal, means for phasing the synchronous detector relative to the signal components supplied thereto to produce an output signal corresponding to fluid flow, means for changing the relative phase of the synchronous detector and the signal components supplied thereto to produce an output signal corresponding to the quadrature signal component, and means for reducing the exponents of the frequency amplitude factors of the fluid flow and quadrature signal components by different amounts during the production of corresponding output signals to substantially eliminate the respective frequency amplitude factors.

11. A gyroscopic mass flowmeter which comprises a structure having a fluid conduit of loop form, means mounting said loop conduit structure for angular oscillation about mutually perpendicular drive and torque axes approximately in the plane of the loop, driving means including a motor for oscillating the loop conduit structure about the drive axis to produce gyroscopic couples about the torque axis varying with fluid flow, said loop conduit structure having an unbalanced mass about the drive and torque axes, transducer means mounted to respond to movement of the loop conduit structure about the torque axis for producing an alternating signal component varying with fluid flow and an alternating signal component in phase quadrature therewith corresponding to the mass unbalance, said alternating signal components having amplitude factors varying with the frequency of oscillation about the drive axis with respective different exponents, an integrating amplifier connected to receive the output of the transducer means and having a number of stages of integration predetermined to substantially eliminate the frequency amplitude factor in the fluid flow signal component, a synchronous detector synchronized with the oscillation of the loop conduit structure about the drive axis and having a predetermined reference phase therewith, means for supplying the output of the integrating amplifier to the synchronous detector with the fluid flow signal component thereof in phase with said reference phase to produce an output signal corresponding to fluid flow, an additional integrating stage producing a substantially 90° phase shift, and means operable to connect the additional integrating stage in cascade with said integrating amplifier and supply the output of the cascaded integrating stages to the synchronous detector to produce an output signal corresponding to the quadrature signal component in which the frequency amplitude factor thereof is substantially eliminated.

No references cited.